Nov. 29, 1949     W. H. HUNTER     2,489,643
HEATING AND PRESSING APPARATUS
Filed Oct. 18, 1943
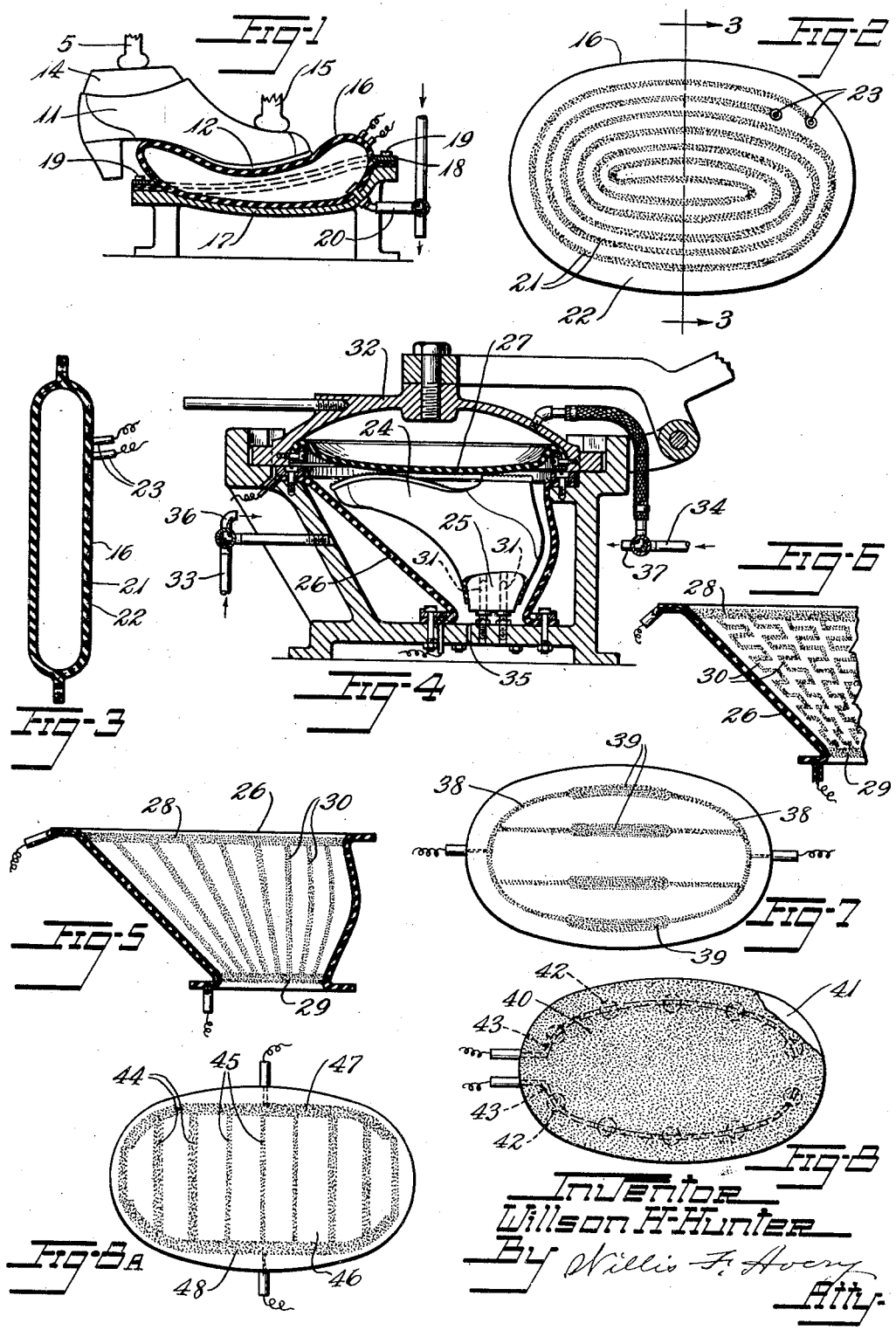

Patented Nov. 29, 1949

2,489,643

UNITED STATES PATENT OFFICE 2,489,643

HEATING AND PRESSING APPARATUS

Willson H. Hunter, Akron, Ohio, assignor to The B. F. Goodrich Company, New York, N. Y., a corporation of New York Application October 18, 1943, Serial No. 506,720

7 Claims. (Cl. 219—19)

1

This invention relates to the heating or the simultaneous heating and pressing of articles by means of flexible cores or envelopes, and is useful especially in the compacting and vulcanizing of footwear, for example. For the manufacture of many objects such as hats, ceramic or plywood articles, tires and footwear, methods have been suggested of forming or molding or compacting such articles by means of flexible bags, diaphragms or blankets through the application of fluid pressure to one surface in order to squeeze the article between the flexible material and an external or internal form or mold. When simultaneous pressing and heating are to be used during the forming step, the source of heat usually recommended heretofore has been steam, hot water or heated air applied to that surface of the flexible pressure member not in contact with the article, whence the heat has been conducted through the flexible member to the surface of the article and thence through its structure. Inasmuch as the flexible walls ordinarily have been constructed of rubber or of rubber with cloth insert, the rate of heat transfer through the walls has been slow and the heating fluid, as it has cooled, has had to be constantly removed and replaced with fluid at the desired higher temperature. Consequently the use of such media as the source of heat involves the installation of equipment such as heaters, pipes, valves and traps in arrangements which cannot be moved from place to place without dismantling and reassembling.

An object of the present invention is to provide improved flexible members for pressing and heating objects of various kinds using for the means of heating electrically conductive rubber incorporated as an integral part of the flexible units. The electrically conductive compositions can be made by incorporation with the rubber of conducting powdered graphite, finely divided carbon black made from acetylene or natural gas, powdered metals or other suitable finely pulverized conducting material. The term "rubber" as used in the specification and claims includes not only natural rubber but also gutta percha, balata, and all other naturally occurring substances of similar character, and includes also synthetic rubber and other rubber-like materials such as copolymer of butadiene with styrene, acrylonitrile or other suitable materials, polyisobutylene and its copolymers, plasticized polymers of vinyl compounds and so on. The conducting portions of the flexible structure are equipped with suitable means for connection with ordinarily available sources of electric power such as lighting circuits.

2

Furthermore it is possible by placing the conducting rubber portions at the surface of the flexible sheet which comes in contact with the object under treatment, to apply heat directly to the object without causing it to pass first through the poorly conducting walls of the flexible pressing member itself. The simplicity of the equipment, eliminating as it does the necessity of expensive installation of pipes and other paraphernalia, is advantageous also. These and other objects and advantages will be manifest from the following description, reference being had to the accompanying drawings in which:

Fig. 1 is an elevation, partly in section, of apparatus constructed in accordance with and embodying the invention for pressing soles on shoes, Fig. 2 is a plan viewed from above of the pressing member showing one form of heating path of conducting rubber, Fig. 3 is a section through the pressure member taken along the line 3—3 of Fig. 2, Fig. 4 is an elevation in section of apparatus constructed in accordance with and embodying the invention for combined pressing and vulcanizing of rubber footwear, Fig. 5 is a view in section of the pressure member showing one pattern of conducting portions, Fig. 6 is a view like Fig. 5 but showing another pattern of conducting portions, Fig. 7 is a plan view of a pressure member constructed for varying temperature at different parts of the surface, and Figs. 8 and 8a are views like Fig. 7 but showing different arrangements for varying the temperature from point to point.

In Fig. 1 a leather or cloth shoe 11 with a sole 12 held in position on its bottom by a layer of adhesive cement is mounted on a last 14 and held in position by suitable pressure feet 15, against a flexible pressure member 16 made in accordance with and embodying the invention. The pressure member, shown in Figs. 1, 2 and 3, is in this instance a bag made preferably of soft vulcanized rubber with or without cloth insert as desired. It is positioned within a support 17 and clamped in place by means of a flange 18 and bolts 19 or other suitable attachments. The bag is equipped with connecting inlet and outlet tube 20 through which fluid under pressure may be admitted in order to press the bag against the sole of the shoe and may later be expelled to relieve the pressure after the sole is properly attached to the shoe.

Conducting soft rubber composition in the form of flat ribbons or strips 21 of any suitable cross sectional form is embedded in a non-conducting soft rubber matrix 22, which constitutes the outer flexible sheet wall of the bag 16, this wall being integral throughout its thickness, as shown, and being effective itself to apply heat while it conforms resiliently to the contoured article so that it is unnecessary to provide heating devices back of this wall. The connection of the conducting rubber to a source of electric power is made by means of brass or other suitable connectors 23 one end of each of which is embedded in the conducting rubber preferably before vulcanization and firmly adhered to it by any of the well-known methods of attaching rubber to metal during vulcanization. When the pressure bag is to be heated during operation an electric current is passed through the conducting rubber which, because of its electrical resistance, is heated. The amount of heat developed per unit of time varies as the resistance of the conducting rubber circuit and the square of the current strength. It is possible, therefore, by regulating the size of the conducting rubber strips and the voltage impressed between the terminals 23 to control the temperature developed at the surface of the pressure member. The heat flows from the conducting strip to the non-conducting rubber adjacent to it in the pressure member and to the object against which the bag is pressed, and this heat is developed and applied directly at the surface of the work.

The operation of attaching a sole to a shoe is carried out as follows. Suitable coatings of an adhesive, preferably a rubber composition vulcanizable to a non-plastic consistency at a suitable temperature in a short time are first applied as a solution in organic solvent or as a dispersion in aqueous media to the bottom of the shoe and to the upper surface of the rubber sole, and the liquid portion allowed to evaporate. The sole is then applied to the bottom of the shoe and lightly pressed in position by hand to insure its proper location on the shoe. The last with the shoe and sole in position on it is then placed on the pressure bag 16 and fastened in place by the adjustable pressure feet 15. Fluid under pressure is now applied to the inside of the bag forcing it against the sole and firmly compacting the sole to the bottom of the shoe. The conducting rubber may be heated before the shoe is placed in position on the bag or connection with the source of electric power may be made after the pressure is applied within the bag. Because of its low heat capacity air or some other suitable gas is preferred to any liquid as the pressure-imparting fluid. If it is desired to reduce heat losses through the bag to the fluid inside it, the fluid before it is inserted may be heated to the temperature of the bag. After the pressing and heating of the sole against the shoe has been continued sufficiently long to set the vulcanizable adhesive composition the pressure within the bag is decreased and the last with the shoe is removed from its position in the bag.

Even though a non-vulcanizing adhesive is to be used for attaching the sole to the shoe, the heating and pressing operation is still of advantage because the heat will soften the adhesive, make it knit more thoroughly to the shoe and moreover the vapor of volatile solvent or trapped gases will be expanded and forced out from between the sole and the shoe.

If desired, the surface sheet of flexible material with its accompanying electrically conducting soft rubber may be backed by resilient sponge rubber or other padding material in lieu of the fluid pressure cushion, and pressure of the surface sheet against an article may be produced by indentation of the article into the pressure member.

It may be desired moreover to heat an article without compacting it. Under such circumstances the flexible heated wall which will readily conform to the shape of the article may be used and only sufficient force applied to produce contact between the wall and the surface of the article without compacting the article against a form or other object, or the wall may simply be brought close to the surface of the article which will then be heated by radiation from the electrically heated wall surface.

Fig. 4 depicts another application of the invention. In this instance a rubber overshoe 24 on a last 25 is positioned between pressure members 26 and 27 constructed in accordance with and embodying the invention. In this instance the shoe is entirely surrounded by heating and compressing members and is compacted and vulcanized simultaneously. For the lower pressure bag 26 the conducting circuit may be constructed as shown in Figs. 2 and 3 or it may be constructed as shown in Fig. 5 or in the embodiment of Fig. 6. In these latter cases the two poles of the electric circuit are attached to rings of conducting rubber 28 and 29 connected by strips 30 of the same material. The strips as shown in Fig. 5 are farther apart at the top than at the bottom, and as shown in Fig. 6, the strips are arranged so as to cover the entire surface more evenly with the heating elements. Inasmuch as the strips of conducting rubber which run from one ring to the other are of unequal length it may be desirable, in order to equalize the temperature over the surface of the bag, to alter the resistance of individual strips by changing their cross-sectional area, thus controlling their resistance and the amount of heat developed by passage of the electric current to produce the pattern of heat distribution desired.

Other designs of heating elements may be used to advantage.

In operating the equipment shown in Fig. 4 the last containing the shoe is placed in position on the pins 31, the lid 32 is closed and clamped shut, and fluid pressure is applied inside the bags 26 and 27 through inlets 33 and 34. The surfaces of the bags are thus forced into intimate contact with the shoe, and heat is transferred from the hot conducting vulcanized rubber on the bag surface to the vulcanized rubber in the shoe, raising its temperature to the degree desired. As a result of the heat the rubber compositions of the shoe are softened and, because of the enveloping pressure bags, the parts are compacted, any entrapped gases are forced out and may escape through a vent 35 provided for the purpose. As the heat is continued the shoe begins to vulcanize and the operation is continued until the vulcanization is complete. Then the pressure is released through the vents 36 and 37 the lid of the vulcanizer is raised and the shoe removed.

Various arrangements of the heating conductors may be used for sundry purposes. If desired, the temperature may be varied in different parts of the pressure member or, when two such members are utilized in the same apparatus, the separate pressure member may be heated to different temperatures.

In Fig. 7 the current is passed between strips of conducting rubber 38, 38 through a number of connecting strips of the same material 39, 39. These connecting strips are made of such sectional areas that for a part of the length of each the resistance is less than that in the other parts. Since the current flowing through a strip is the same through its entire length and inasmuch as the amount of heat generated between two points of a circuit by passage of the electric current varies as the resistance between those points the quantity of heat and the temperature of the connecting strips can be varied in the parts, and by proper design the relative temperatures in the bag surface controlled as desired. Continuously graduated resistance may be made by tapering conductors from one point to another.

Still another method of varying temperatures is illustrated in Fig. 8. In the pressure member here shown the conducting rubber 40 extends over the whole pressing surface and constitutes a layer upon and vulcanized integrally to a sheet of non-conducting rubber 41. In the conducting layer are a number of small metal discs 42, 42 to which the rubber is firmly adhered, joined in series in each leg of the electric circuit. The various discs in each series are connected with flexible metallic conductors 43, 43 electrically insulated between discs or not as desired. By suitably spacing the discs the temperatures in different parts of the bag may be varied and controlled as desired. In Fig. 8a, strips 44, 45 of the conductive rubber of differing cross section are embedded in a non-conducting surface 46 and pass current between conducting strips 47, 48 in a manner to produce varying heat over the surface. The production of varying heat is of advantage for example in the apparatus shown in Fig. 4, where the conduction pressure member 27 which comes in contact with the relatively thick sole of the rubber shoe may be arranged to heat these thick portions to a higher temperature than the thinner uppers in contact with pressure member 26.

Should the article to be subjected to heat and pressure present to the pressure member a continuous metallic surface, the metal may short circuit a current flowing through the conducting rubber in the pressure member and prevent proper operation of the apparatus. In such event it may be desirable to insert the conducting rubber beneath the surface and cover it with a layer of electrically non-conductive rubber. In order that this insulating surface coating reduce the diffusion of heat to the article as little as possible the insulation should be made only thick enough to insure safety against electrical puncture.

These examples of my invention make it possible for one skilled in the art to adapt the equipment for many other purposes where heating or simultaneous heating and pressure have been utilized in the past through other devices or wherever such treatment may be newly adopted advantageously. Such adaptations of this new equipment may be desirable in many splicing operations on rubber articles, for example, auto inner tubes or belts, in the sealing of thermosetting adhesives during the manufacture of plywood articles and so on.

It is evident from the above description of my invention that by the means set forth in the examples and in other similar ways it is possible to heat objects uniformly over any portion of their surface or to different temperatures at different points on the surface. By dividing the heating elements into sections with separate switches it is possible also to heat different sections of the pressure member for different lengths of time. The heating by electrical means makes possible a flexibility of temperature distribution and control not obtainable with other heating media.

Variations may be made without departing from the scope of the invention as it is defined in the following claims.

I claim:

1. Apparatus for heating an article, said apparatus comprising a flexible bag for disposition against the article and means in said bag for applying heat to the article, the heating means comprising a non-conductive flexible matrix in the article-contacting wall of said bag and electrically conductive rubber strips embedded in said non-conductive matrix, and means for passing an electrical current through the conductive material.

2. Apparatus for heating an article, said apparatus comprising a flexible wall for disposition against the article, and means in said wall for applying heat to the article, the heating means comprising electrically conductive rubber strips embedded in a non-conductive matrix in said flexible wall so arranged as to produce different temperatures in different parts of the structure and means for passing an electrical current through the conductive material.

3. Apparatus for heating and pressing an article, said apparatus comprising a flexible wall for disposition against the article, means associated with said wall for applying pressure to the article, and means in said wall for applying heat to the article, the heating means comprising a relatively non-conductive material in said flexible wall and electrically conductive rubber strips embedded in said non-conductive material so arranged as to produce different temperatures in different parts of the structure, and means for passing an electric current through said conductive material.

4. Apparatus for heating and pressing an article, said apparatus comprising a flexible bag for disposition against the article, means for applying fluid pressure within the bag, and means in an article-contacting wall of said bag for applying heat to the article, the heating means comprising electrically conductive rubber strips embedded in a non-conductive flexible matrix in said wall so arranged as to produce different temperatures in different parts of the structure, and means for passing an electric current through the conductive material.

5. Apparatus for heating and pressing contoured articles such as footwear and the like, said apparatus comprising an article-contacting sheet wall having a non-conductive matrix of resilient rubber-like material including a plurality of spaced-apart heating elements of electrically conductive rubber composition united throughout their extent with said matrix of said wall and said sheet wall being integral throughout its thickness intermediate its margins and flexibly and resiliently conformable intimately to the surface of the article, fluid-pressure means for pressing said sheet wall directly against the article in the conforming relation, and means for passing an electric heating current through said elements of conductive rubber composition to heat the article while said wall including the heating elements thereof is pressed against the article in the surface-conforming relation.

6. Apparatus for heating and pressing contoured articles such as footwear and the like, said apparatus comprising an article-contacting sheet wall having a flexible matrix of relatively non-conductive rubber material with a heating element of electrically conductive rubber composition embedded in and united throughout its extent with said flexible matrix of said wall at the article-contacting face thereof and said sheet wall being integral throughout its thickness and flexible for disposition in intimately conforming relation to the surface of the article, fluid-pressure means for pressing said sheet wall directly against the article in the conforming relation, and means for passing an electric heating current through said heating element of conductive rubber composition to heat the article while said wall including said heating element is pressed against the article in the surface-conforming relation, said heating element of conductive rubber composition being constructed and arranged to effect different temperatures in adjoining parts of said wall intermediate the margins of the wall.

7. Apparatus for heating and pressing contoured articles such as footwear and the like, said apparatus comprising a flexible bag having an article-contacting sheet wall integral throughout its thickness which wall has a flexible matrix of electrically non-conductive rubber material for disposition in intimately conforming relation to the surface of the article, means for inflating said bag and pressing said article-contacting wall directly against the surface of the article in conforming relation, means comprising a heating element of electrically conductive rubber composition disposed in overlying relation to and united throughout its extent with said flexible matrix of said wall at the article-contacting face thereof for intimately conforming to the surface of the article and for applying heat to the article and constructed and arranged to effect different temperatures in adjoining parts of said wall intermediate the margins of the latter, and means for passing an electrical heating current through said heating element of conductive rubber composition to heat the article while said article-contacting wall including said heating element is pressed against the article in the surface-conforming relation.

WILLSON H. HUNTER.

REFERENCES CITED

The following references are of record in the file of this patent:

UNITED STATES PATENTS

| Number | Name | Date |
|---|---|---|
| 1,881,198 | Kirk | Oct. 4, 1932 |
| 2,032,294 | McDonald | Feb. 25, 1936 |
| 2,052,644 | Murphy | Sept. 1, 1936 |
| 2,205,543 | Rideau et al. | June 25, 1940 |
| 2,223,154 | Thornton-Norris | Nov. 26, 1940 |
| 2,255,376 | Bull et al. | Sept. 9, 1941 |
| 2,274,840 | Marick et al. | Mar. 3, 1942 |
| 2,287,320 | Mitchell | June 23, 1942 |
| 2,298,037 | Crandell | Oct. 6, 1942 |
| 2,324,644 | Powell et al. | July 20, 1943 |
| 2,331,296 | Bendix | Oct. 12, 1943 |
| 2,333,476 | Duston | Nov. 2, 1943 |